United States Patent [19]

Lai et al.

[11] Patent Number: 5,111,374
[45] Date of Patent: May 5, 1992

[54] HIGH FREQUENCY QUASI-RESONANT DC VOLTAGE NOTCHING SCHEME OF A PWM VOLTAGE FED INVERTER FOR AC MOTOR DRIVES

[75] Inventors: Jih-Sheng Lai; Bimal K. Bose, both of Knoxville, Tenn.

[73] Assignee: The University of Tennessee Research Corp., Knoxville, Tenn.

[21] Appl. No.: 542,903

[22] Filed: Jun. 22, 1990

[51] Int. Cl.$^5$ ............................................. H02M 5/45
[52] U.S. Cl. .................................. 363/37; 363/41; 363/98; 363/132; 318/811
[58] Field of Search .............. 363/95, 49, 98, 41, 363/48, 138; 323/222, 235; 318/778, 806, 811

[56] References Cited

U.S. PATENT DOCUMENTS

| | | | |
|---|---|---|---|
| 4,236,201 | 11/1980 | Okado | 363/138 |
| 4,642,476 | 2/1987 | Honig | 307/108 |
| 4,720,667 | 1/1988 | Lee et al. | 323/271 |
| 4,720,668 | 1/1988 | Lee et al. | 323/271 |
| 4,730,242 | 3/1988 | Divan | 363/37 |
| 4,841,220 | 5/1989 | Tabisz et al. | 323/282 |
| 4,857,822 | 8/1989 | Tabisz et al. | 323/282 |
| 4,931,716 | 6/1990 | Jovanovic et al. | 323/285 |

OTHER PUBLICATIONS

Lee, Fred C. and Liu, Kwang-Hwa, Zero-Voltage Switching Technique in DC/DC Converters.
IBM Tech. Disclosure: Switch Voltage Regulator vol. 6 No. 8 Menard, Jan. 8, 1964.

*Primary Examiner*—William H. Beha, Jr.
*Assistant Examiner*—Bruce Dunn
*Attorney, Agent, or Firm*—James B. Hinson

[57] ABSTRACT

A circuit for converting a DC voltage to a pulsating DC voltage useful as a power source for operating an AC machine. The circuit includes means for controlling the amplitude of the pulsating DC voltage as the load changes and means for controlling the duration of the pulses comprising the pulsating DC voltage.

4 Claims, 9 Drawing Sheets

Fig.11
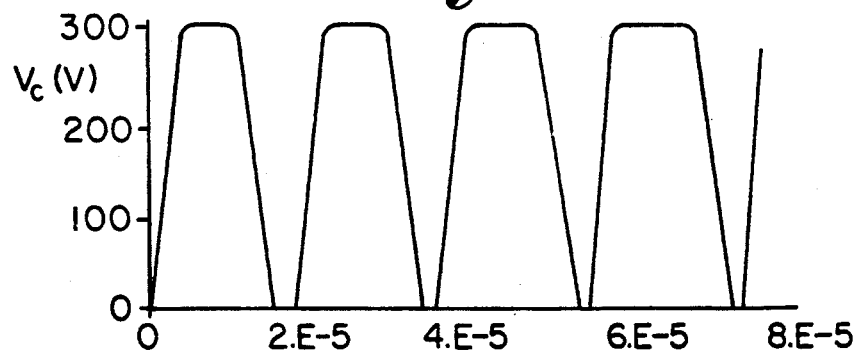
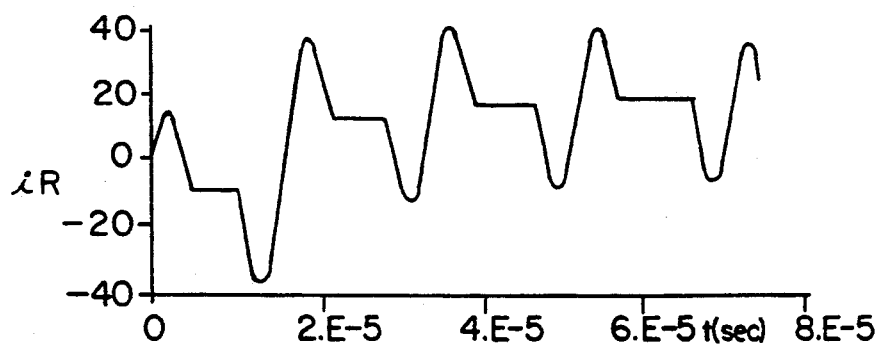
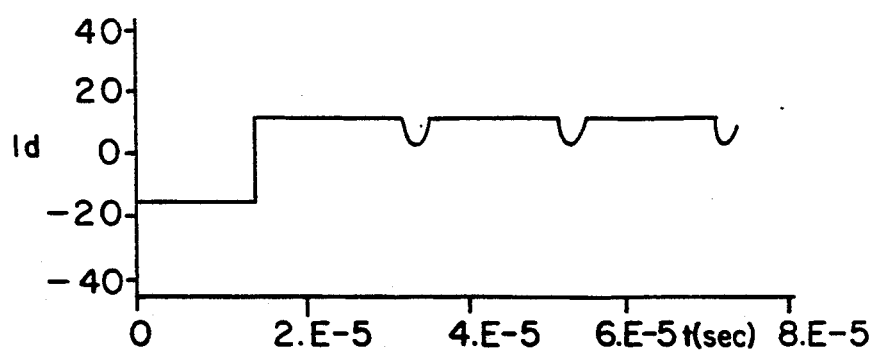
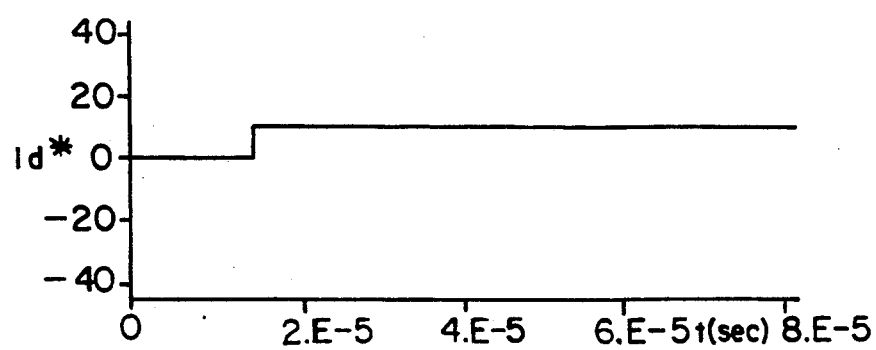

HIGH FREQUENCY QUASI-RESONANT DC VOLTAGE NOTCHING SCHEME OF A PWM VOLTAGE FED INVERTER FOR AC MOTOR DRIVES

BACKGROUND OF THE INVENTION

1. Field of the Invention

The invention relates to control systems and more specifically to Quasi-resonant DC link converters for use in conjunction with AC machines.

2. Descriptions of the Prior Art

Resonant link DC to DC converters utilizing zero voltage or zero current switching schemes are available in the prior art. The resonant link concept is being extended to DC to AC converters for AC machine applications. Resonant link converters can be divided into two classes, the first using shunt resonant circuits and the second series resonant circuits. In applications such as controlling AC motors the output of the converter is coupled to the motor through a conventional inverter.

Conventional inverters may utilize either zero voltage or zero current voltage switching to reduce power loss. Zero voltage switching is currently preferred because it reduces the voltage stress on switching devices and does not require the use of snubber circuits.

Voltage overshoot and the resulting stress of switching components is a generic problem with resonant link converters.

Typically, if the resonant converter operates without any load, the converter output voltage swings to twice the supply voltage. As load changes, the voltage swing varies up and down. In situations where bi-directional energy transfer is provided for, the output voltage of the converter can swing to three times the supply voltage. One prior art approach to reducing this voltage swing is the utilization of voltage clamping with energy recovery. Additionally, problems are encountered during transition from the utilization to the energy feedback mode.

Reliable operation requires that the output voltage of the converter cross zero at every cycle. In prior art resonant link converters, the output voltage frequently failed to cross zero due to a finite "Q" of the resonant circuit, resulting in the voltage tending to build up on every resonant cycle.

It has been proposed that a fixed initial current be established in the inductor of the resonant link to solve the zero crossing problem. However, fluctuating and directional inverter input current tends to cause zero crossing failure unless the initial current is established on a worse case basis. Establishing an initial current on a worse case basis, worsens the voltage overshoot problem. Controlling the initial current in accordance with the criteria disclosed in this patent application solves the problems associated with a fixed initial current.

In some applications it is also desirable to vary the frequency of the converter. Varying the frequency can be utilized to reduce the circulating phase currents. Reducing the circulating phase currents reduces electrical losses, reduces electrical noise and reduces mechanical noise. Prior to the current invention, no solution to this problem has been proposed or implemented.

SUMMARY OF THE INVENTION

The preferred embodiment of the invention comprises a converter and a controller for controlling the flow of electric energy from a power source to a load. The controller utilizes a DC to AC converter which includes at least first and second reactive circuit elements coupled in series and between first and second terminals of a DC voltage source. Switch means periodically changes state to produce a pulsating bi-directional current in at least one of the reactive elements with adjacent pulses of the bi-directional current being separated by a variable time interval during which the bi-directional current is substantially zero. Varying the time interval during which the bi-directional current is substantially zero permits the operating frequency of the converter to be varied. The switch means also provides means to establish an initial current in at least one of the reactive elements with the magnitude of the initial current selected to control the amplitude of the pulsed voltage to the desired peak value and to assure that the pulsed voltage decreases to zero during a predictable time interval. This provides a convenient means for controlling the amplitude and frequency of the output voltage of the converter.

DESCRIPTION OF THE DRAWINGS

FIG. 7 is a schematic diagram of a converter comprising the preferred embodiment of the invention.

FIG. 11 is a series of curves illustrating the simulated phase currents.

DETAILED DESCRIPTION

Figure 1:
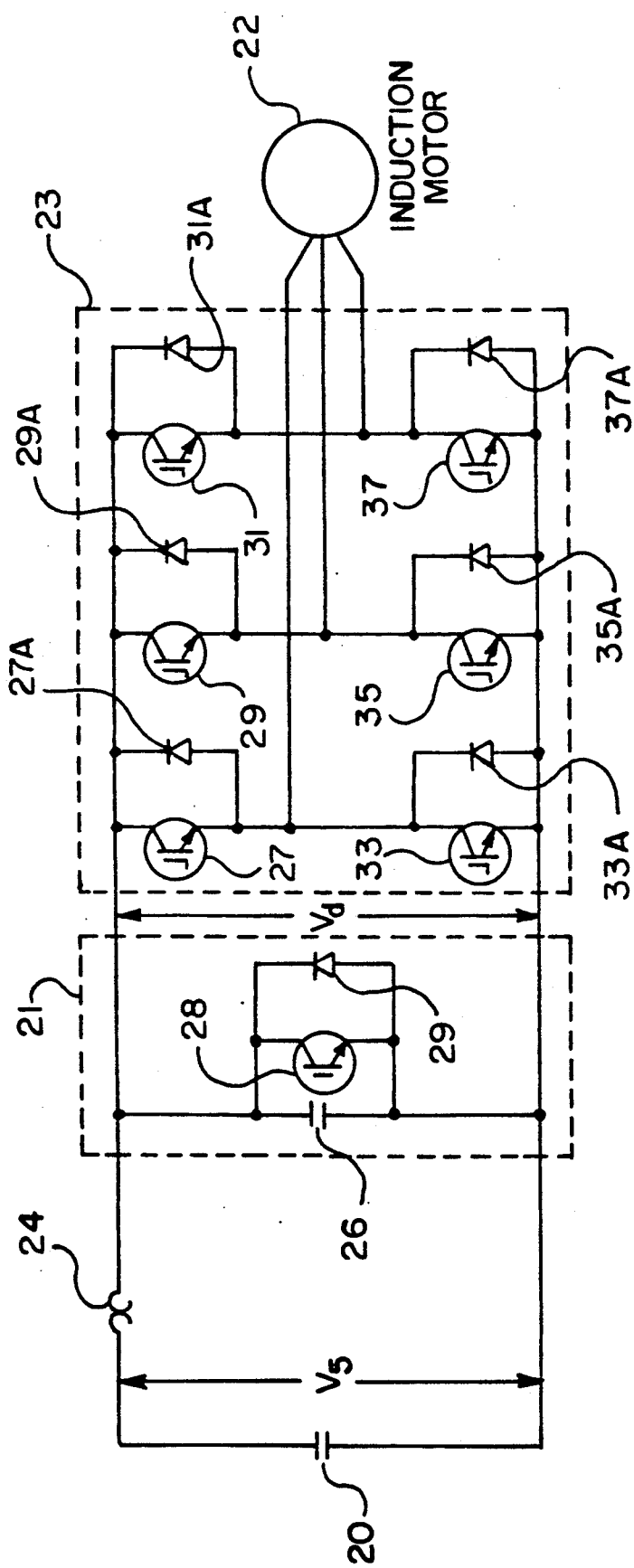
FIG. 1 is a schematic diagram of a prior art resonant DC link converter for controlling an AC machine.

A conventional prior art resonant DC link converter system is illustrated in FIG. 1. This system converts the DC output voltage $V_s$ of a voltage source 20 to a pulsating supply voltage $V_d$ for operating an induction motor 22. This system will be used to calculate the initial current conditions necessary to control the maximum value and the minimum value of $V_d$ to the desired values. These initial current conditions are applicable to the converter comprising the invention.

For purposes of convenience, the system can be considered as consisting of a conventional voltage source 20, a resonant link DC to AC converter 21, a conventional inverter 23 and a load 22.

More specifically, the resonant link converter 21 converts the DC output voltage $V_s$ of the voltage source 20 to a pulsating voltage $V_d$ utilizing a resonant circuit which consist of at least first and second reactive elements, for example an inductor 24 and a capacitor 26. A switch 28, preferably an insulated gate bipolar transistor, is connected in parallel with the capacitor 26, selectively and sequentially changes state to control the current through the inductor 24.

More specifically at the beginning of each cycle of the pulsed voltage Vd, switch 28 is turned on to establish a predetermined initial current in the inductor 24. When the desired initial current value has been attained, this switch is opened to induce an AC current in the inductor 24 and the capacitor 26 at the resonant frequency of these components.

When the switch 28 is on, a diode 29 clamps the voltage across the capacitor 26 to approximately zero. Thus, except for the zero crossing interval when diode 29 is forward biased and time intervals when switch 28 is on, the output voltage $V_d$ of the converter 21 is sinusodial and has a period determined by the natural resonant frequency of inductor 24 and capacitor 26. The time interval during which switch 28 is open is referred to as the resonant cycle.

The inverter includes switches 27, 29, 31, 33, 35, and 37, which control the phase currents to AC (machine) motor 22. As is conventional, these switches are by-passed by diodes 27A, 29A, 31A, 33A, 35A and 37A. These switches are also preferably insulated gate bipolar transistors.

The voltage $V_d$ across the capacitor 26 when the switch 28 is open is determined by the current flowing in capacitor 26 which in turn is the difference between the inductor current and the input current to the inverter 23. The inverter input current $I_d$ is a function of the motor phase (load) currents. If the inverter input current $I_d$ is assumed to be constant during a resonant cycle, the maximum and minimum values of the capacitor voltage $V_d$ to assure zero crossing are determined by the initial capacitor current. The following analysis establishes the criteria for controlling the inductor current to assure the desired operating conditions. Specifically, the maximum and minimum values of Vd are controlled to the desired values.

Figure 2:
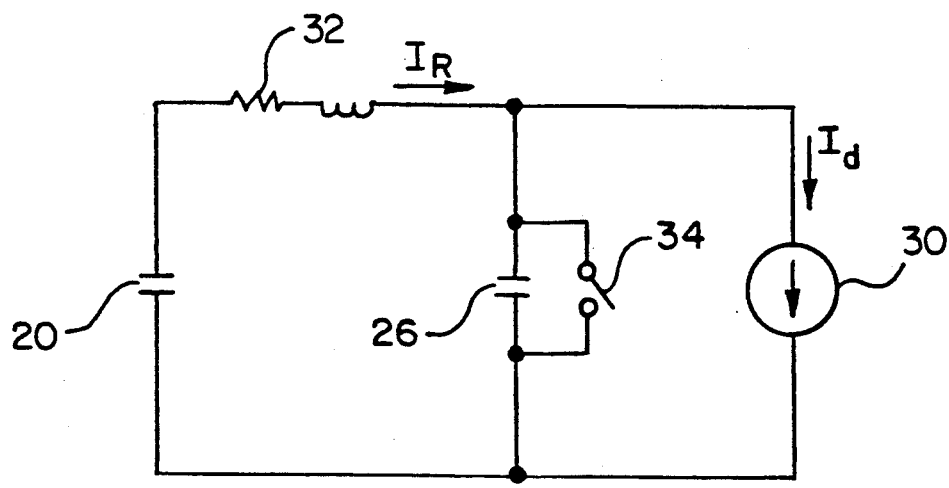
FIG. 2 is a schematic diagram of the equivalent resonant circuit of the resonant link converter, illustrated in FIG. during the resonance interval.

The equivalent circuit of the system is schematically illustrated in FIG. 2 assuming the input current to the inverter 23 and to the induction motor 22 are constant. In this figure the inverter 23 and motor 22 are included and illustrated as a current source 30. A resistor 32 representing the finite "Q" of the resonant circuit has been added. The solid state switch 26 is illustrated for purposes of simplicity, as a mechanical on-off switch 34 and is used, as previously discussed, to establish the desired initial current in the inductor 24. Under these conditions, the network equations can be written as follows with the equations numbered 1 through 10 for easy reference.

$$V_s(t) = I_r(t)R_r + \frac{dI_r(t)}{dt} L_r + V_d(t) \quad \text{Equation (1)}$$

where
$\omega_r = 1/\sqrt{L_r C_r}$ resonant frequency (zero damping)
$\alpha = R_r/2L_r =$ decrement factor
$\zeta = R_r/2Z_r =$ damping ratio
$Z_r = \sqrt{L_r/C_r} =$ characteristic impedance $\omega = \omega_r\sqrt{1-\zeta^2} =$ oscillation frequency $$\theta = \cos^{-1}\zeta = \tan^{-1}\frac{\sqrt{1-\zeta^2}}{\zeta}$$

$$I_r(t) = I_d(t) + C_r\frac{dV_d(t)}{dt} \quad \text{Equation (2)}$$

with initial states $V_d(0)=0$ and $I_r(0)=I_m V_d$ can be calculated from the following equation.

$$V_d(t) = (V_s - I_d R_r)\left[1 - \frac{1}{\sqrt{1-\zeta^2}}\epsilon^{-\alpha t}\sin(\omega t + \theta)\right] + \quad \text{Equation (3)}$$

$$\frac{(I_m - I_d)Z_r}{\sqrt{1-\zeta^2}}\epsilon^{-\alpha t}\sin\omega t$$

$$I_r(t) = I_d + \epsilon^{-\alpha t}\left[(I_m - I_d)\cos\omega t + \frac{2V_s - (I_d + I_m)R_r}{2\omega L_r}\sin\omega t\right] \quad \text{Equation (4)}$$

In the above equations, the voltage component $(I_m - I_d)Z_r$ largely determines the capacitor voltage during the resonance interval. For purposes of this analysis a voltage overshoot is defined to means that the maximum voltage of $V_d(t)$ is higher than $2V_s$ and zero voltage crossing means that the voltage is lower than zero. These valves establish the maximum voltage stress to which the switching devices are subjected.

The following analysis analyzes these specific conditions to determine the desired operating conditions.

Equation (5)

$$\frac{dV_d(t)}{dt} = \quad \text{Equation (5)}$$

$$\omega_r\epsilon^{-\alpha t}\left[\frac{2(V_s - I_d R_r) + (I_d + I_m)R_r}{2\sqrt{1-\zeta^2}}\sin\omega t + (I_m - I_d)Z_r\cos\omega t\right] = 0$$

$$\tan\omega t_n = \frac{2\sqrt{1-\zeta^2}(I_d - I_m)Z_r}{2V_s - (I_d + I_m)R_r} \quad \text{Equation (6)}$$

where $$t_n = \left[n\pi + \tan^{-1}\frac{2\sqrt{1-\zeta^2}(I_d - I_m)Z_r}{2V_s - (I_d + I_m)R_r}\right]/\omega$$

$n = 1, 2$ $$V_d(t_1) = (V_s - I_d R_r)\left[1 - \frac{1}{\sqrt{1-\zeta^2}}\epsilon^{-\alpha t_1}\sin(\omega t_1 + \theta)\right] + \quad \text{Equation (7)}$$

$$\frac{(I_m - I_d)Z_r}{\sqrt{1-\zeta^2}}\epsilon^{-\alpha t_1}\sin\omega t_1$$

where

-continued $$t_1 = \left[\pi + \tan^{-1}\frac{2\sqrt{1-\zeta^2}\,(I_d - I_m)Z_r}{2V_s - (I_d + I_m)R_r}\right]/\omega$$

Equation (8)

$$V_d(t_2) = (V_s - I_dR_r)\left[1 - \frac{1}{\sqrt{1-\zeta^2}}\epsilon^{-at_2}\sin(\omega t_2 + \theta)\right] +$$

$$\frac{(I_m - I_d)Z_r}{\sqrt{1-\zeta^2}}\epsilon^{-at_2}\sin\omega t_2$$

$$t_2 = \left[2\pi + \tan^{-1}\frac{2\sqrt{1-\zeta^2}\,(I_d - I_m)Z_r}{2V_s - (I_d + I_m)R_r}\right]/\omega$$

$$\frac{V_d(t_n)}{V_s} =$$

Equation (9)

$$(1 - 2X_1\zeta)\left[1 - \frac{1}{\sqrt{1-\zeta^2}}\epsilon^{-\frac{\zeta}{\sqrt{1-\zeta^2}}t_n}\sin(\omega t_n + \theta)\right] +$$

$$\frac{1}{\sqrt{1-\zeta^2}}\epsilon^{-\frac{\zeta}{\sqrt{1-\zeta^2}}t_n}(X_0 - X_1)\sin\omega t_n$$

Figure 3:
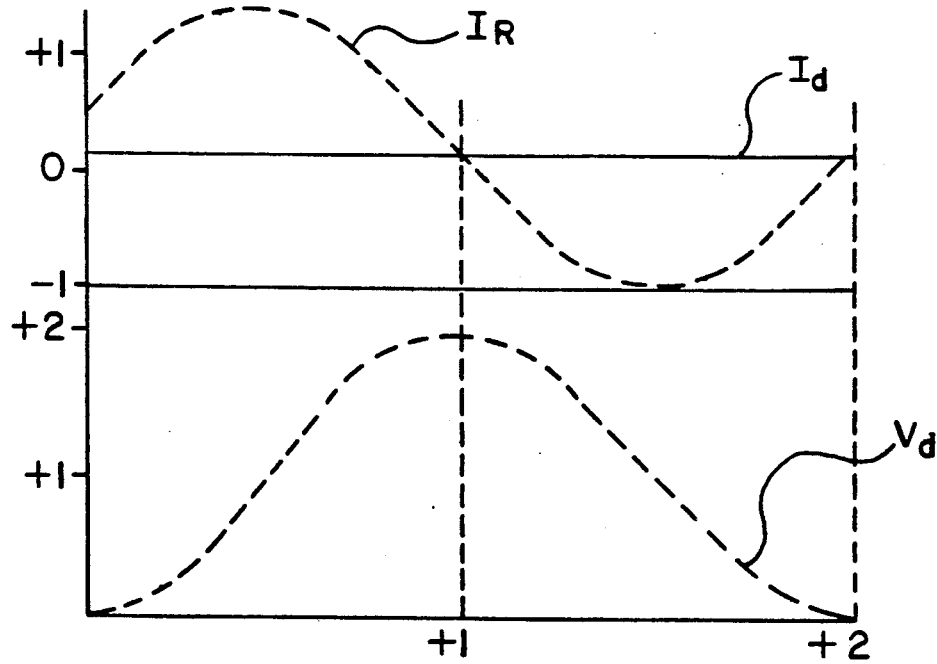
FIG. 3 is a diagram illustrating the voltage and current of the resonant link converter during the resonant cycle.
Figure 4:
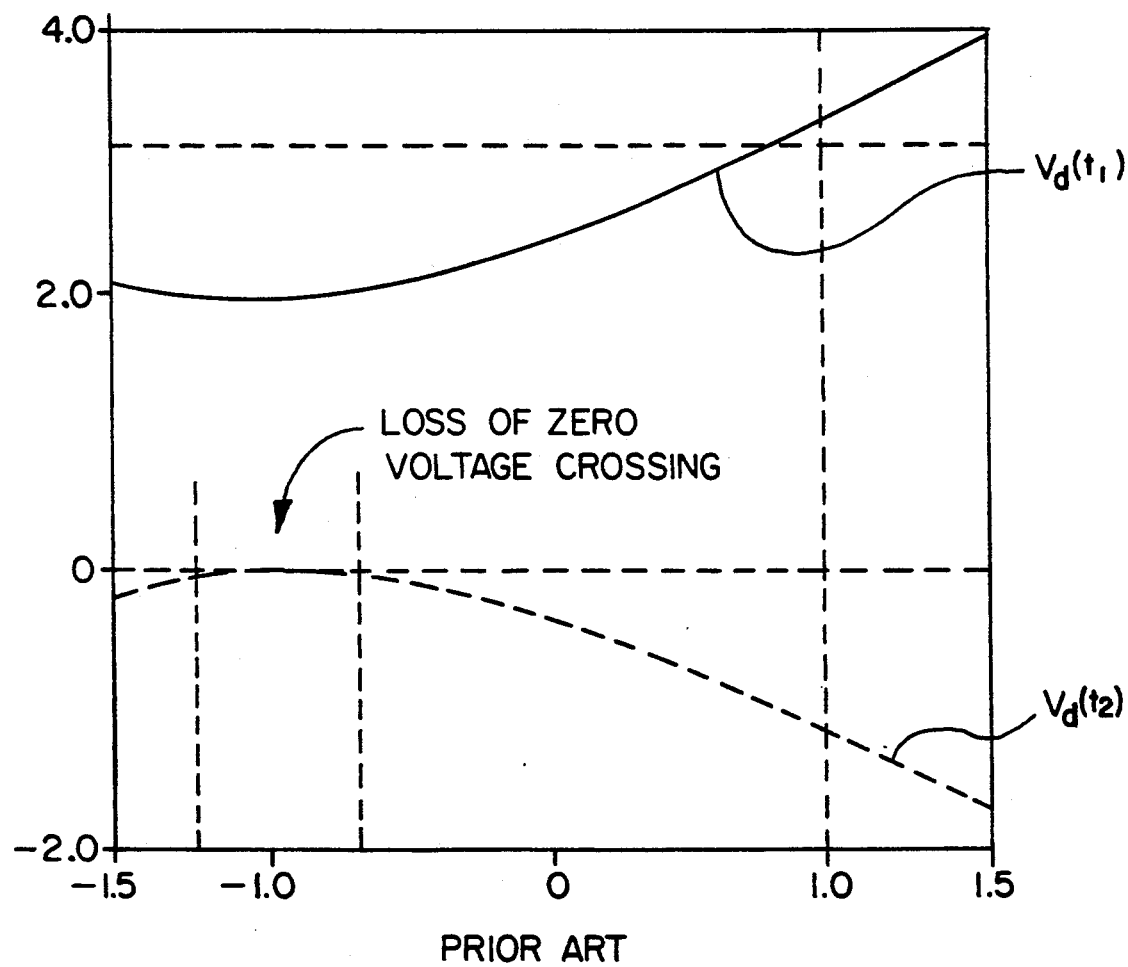
FIG. 4 is a diagram illustrating the maximum and minimum resonant circuit voltage as a function of initial inductor current.

From the above equations, it can be seen that a voltage overshoot occurs when $V_d(t) > 2V_s$ and zero crossing is lost when $V_d(t) > 0$. As illustrated in FIG. 3, the resonant current $I_r$ normally varies between $2I_d$ and zero. Normally the inverter current $I_d$ varies between $+I_1$ and $-I_1$. $I_1$ is the peak phase current. Observing equation (8), it can e seen that the value $(I_m - I_d)$ is the dominant factor causing voltage overshoot. Equation (9) shows that the same factor also determines the zero voltage crossing points. This feature is utilized by the invention to control both the voltage overshoot and zero crossing intervals to restrain the peak voltage of $V_d$ to a selected value and to assure that zero crossing conditions are maintained. FIG. 4 is a diagram illustrating the maximum voltage $V_d(t_1)$ and the minimum voltage $V_d(t_2)$ as a function of the initial inductor current $I_m$. In this analysis the resonant circuit is assumed to operate at 50 Kilohertz with a resonant circuit "Q" of 150. Characteristic impedance for the induction motor 22 is assumed to be $V_s/I_1$ and the current $I_m$ is normalized with the base current $I_1 = V_s/Z_r$. The initial current $I_m$ is set to be equal to $I_1$ then the voltage $(t_i)$ overshoots to 3.2 $V_s$. This large initial overshoot is a result of the high initial capacitor current. By contrast the magnitude of the $V_d(t_1)$ becomes minimum when $I_m - I_d = 0$. Under these conditions, the zero voltage crossing is lost. Since a zero crossing interval is desirable for controlling the inverter, the initial capacitor current is always chosen to be positive.

$I_d$ normally increases during the resonant cycle because of the high magnitude $V_d$. To compensate for this current rise, the initial capacitor current should be higher than the selected value of the graphical solution.

Figure 5:
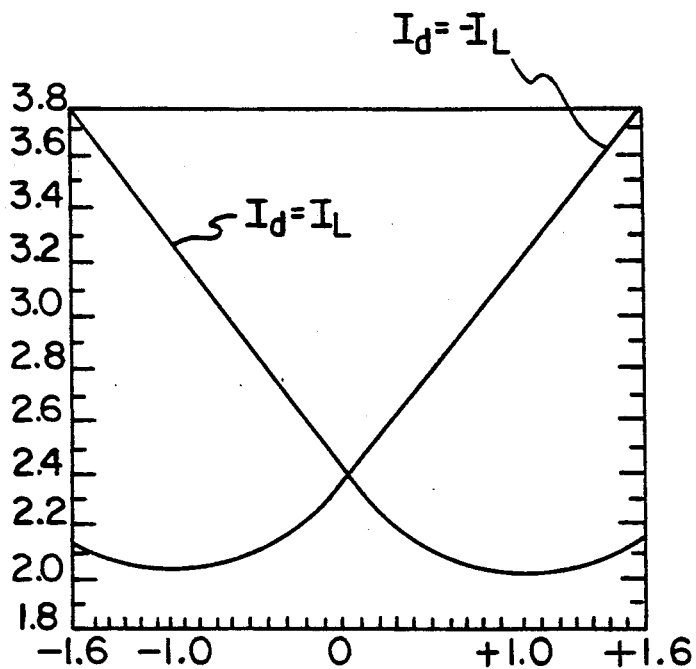
FIG. 5 is a diagram illustrating the region over which the initial current is controlled to maintain the maximum voltage within the prescribed range.
Figure 6:
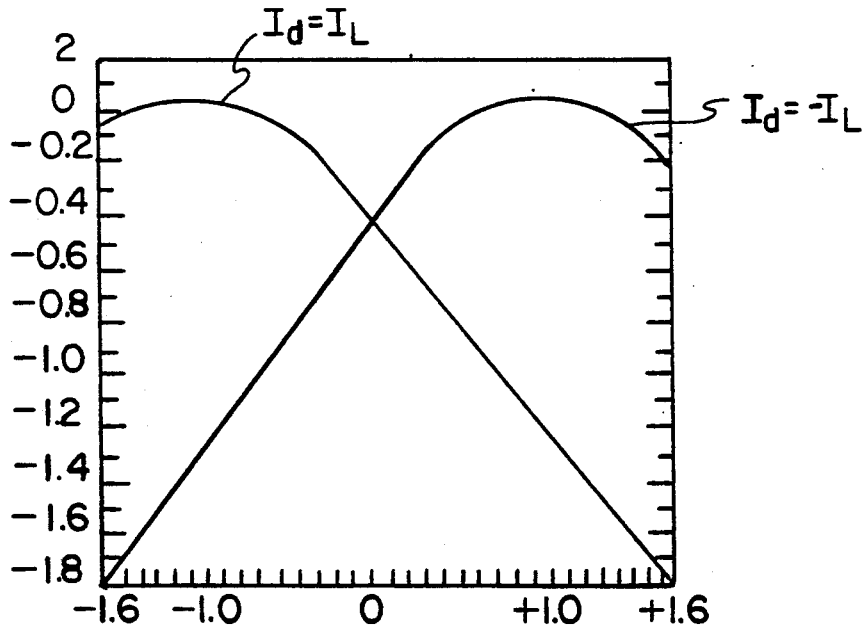
FIG. 6 is a diagram illustrating the range over which the initial current is controlled to maintain zero voltage crossing.
Figure 1:
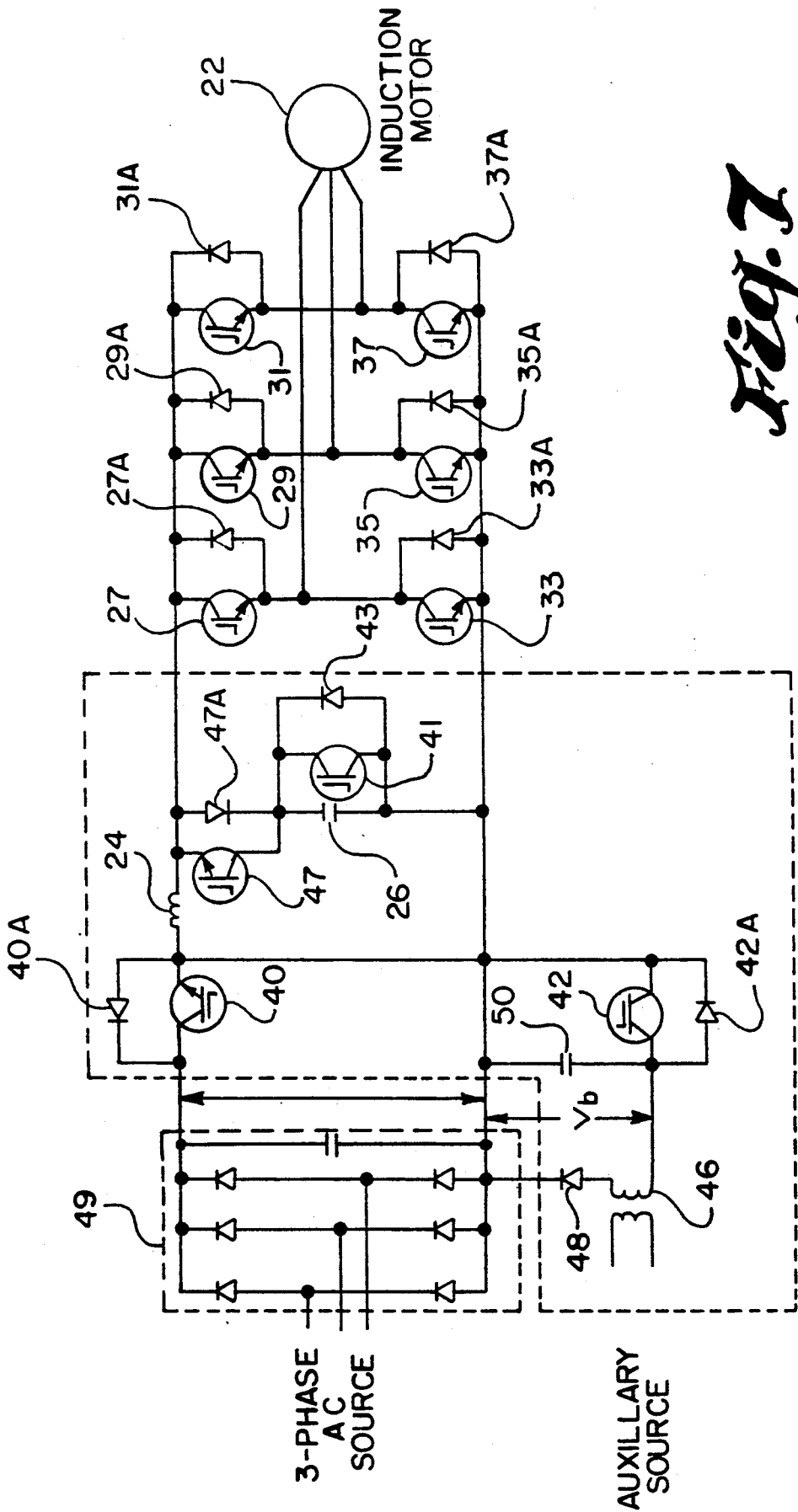

A general solution of $V_d(t_1)$ from equation 8 assuming different inverter currents is illustrated in FIG. 5. Similarly, a general solution for the minimum voltage is shown in FIG. 6. Each of these solutions produces a family of curves. For simplicity of only two curves, two curves corresponding to $I_d = -I_1$ and $I_d = I_1$ are illustrated because the region between these curves is believed to define the practical operating limits of the converter in order to achieve the desired operating condition.

It is also evident from these curves that the initial current $I_m$ must be programmable in accordance with the inverter input current $I_d$ to satisfy the criteria for voltage overshoot and zero voltage crossing requirement. From these curves, it can also be seen that if the current $I_m$ is programmable between approximately $-0.7$ and plus 1.3 that the desired maximum voltage of $V_d(t_1)$ and zero crossing can be maintained. The skew of the initial current $I_m$ around zero is a factor of the initial positive capacitor current requirement previously discussed with reference to FIG. 4.

The prior art circuit previously discussed and schematically illustrated in FIG. 1 is satisfactory for incrementing the initial inductor current $I_m$ at the leading edge of zero crossing interval of $I_m$ by closing the switch 28 causing the current to increase with the slope $V_s/L_r$. However, if the current $I_d$ is less than $I_m$ such that $I_m$ requires a decrease, the circuit illustrated in FIG. 1 is not satisfactory. Additionally, this circuit does not provide means for varying the frequency to reduce losses.

This limitations of the circuit illustrated in FIG. 1 are overcome by the resonant converter utilizing bi-directional initialization circuit illustrated in FIG. 7. This circuit includes means for controlling the maximum amplitude of $V_d$, controlling the minimum value of $V_d$ and varying the frequency of $V_d$. This circuit comprises the preferred embodiment of the invention. Components common to the circuit illustrated in FIG. 1 are identified with the reference numbers first used in FIG. 1.

Figure 8:
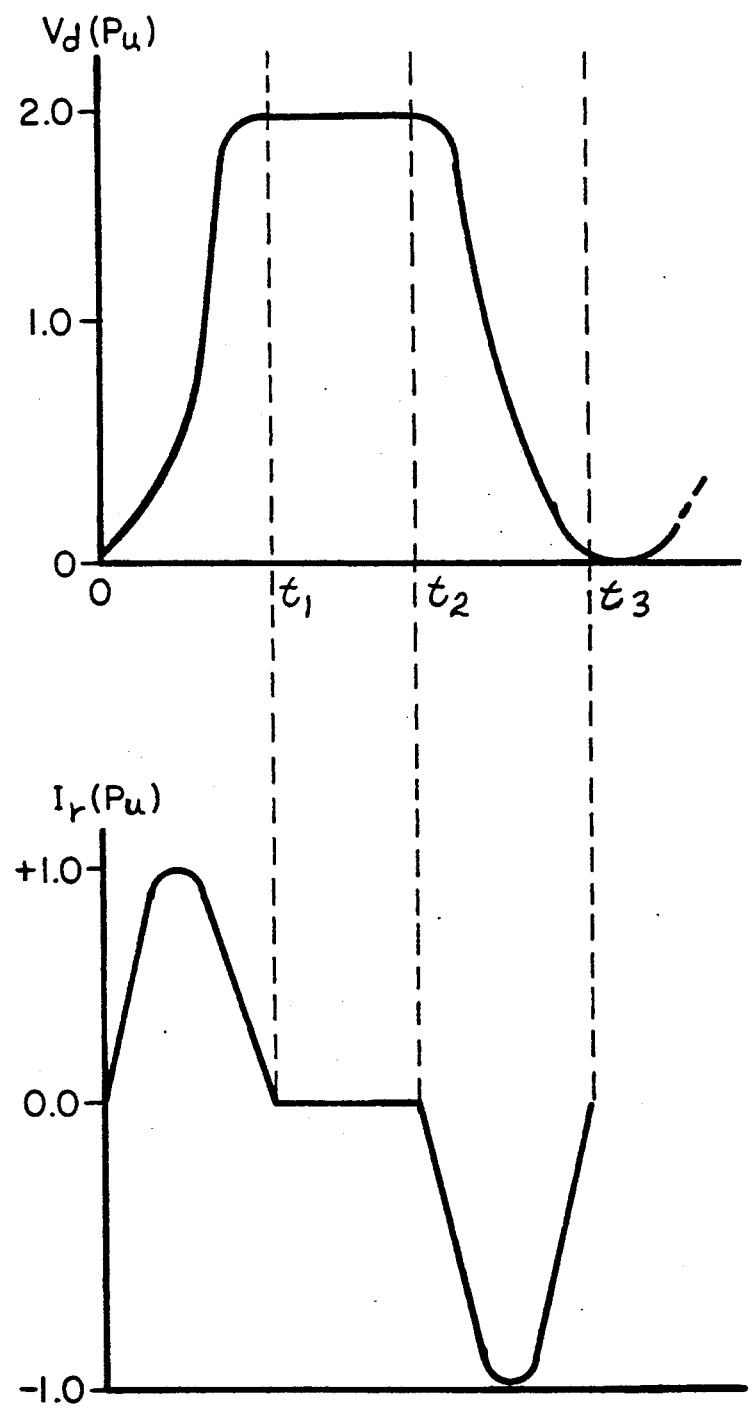
FIG. 8 is a diagram illustrating the relationship between the resonant current and the output voltage of the converter comprising the invention.

A converter comprising the preferred embodiment of the invention is illustrated in FIG. 7. In this embodiment switches 40, 41, 42, and 47 are operated to establish the desired initial current in the inductor 24. As previously described, the value of the initial current determines the zero crossing interval and the maximum amplitude of the output voltage $V_d$, as illustrated in FIG. 8. Switch 47 is selectively operated, as described below, to determine the frequency of $V_d$.

In this circuit switch 40, 47 normally remains closed and the current in inductor 24 is incremented by closing the switch 41 as usual. In order to decrement the current in indicator 24, switch 40, 47 is opened and switches 42 and 41 are closed so that the inductor current decreases with a slope given by $V_b/L_r$ where $V_b$ is the output voltage of an auxiliary DC power supply comprising a transformer 46, a rectifier 48 and a filter capacitor 50. Switch 41 is turned on, as required, to control the inductor current. During normal operating conditions, the switches 40 and 42 operates at a small fraction of the resonant frequency and contribute some additional losses. However, the overall efficiency of the converter is not substantially effected. Switches 40 and 42 are respectively bypassed diodes 40A and 42A.

The current flowing through the capacitor 22 is also controlled by a series coupled switch 47. This switch is selectively turned off as the resonant current $I_r$ passes through zero to control the width of the pulses of $V_c$. That is, opening this switch when Ir is zero causes the peak amplitude of $V_c$ to remain substantially constant until such time as this switch is closed. The resulting wave form for $V_c$ and $I_r$ are illustrated in FIG. 8.

Since the current $I_r$ is interrupted, the mathematical representations are similarly discontinuous.

More specifically, the operation of the converter can be divided into three phases. During the first phase the resonant voltage $V_d$ swings from zero to $2V_s$ in one half of the resonant current cycle. Neglecting the resistance of the passive components, during this interval the voltage $V_c(t)$ can be approximated by the following equation.

$$V_c(t) = V_s(1 - \cos\omega_r t) \quad (0 < t < t_1)$$

$$V_d(t) = V_c(t)$$

$$\omega_r = \left(\frac{1}{L_r C_r}\right)^{\frac{1}{2}}$$

The time interval of this phase can be calculated from the following equation.

$$t_1 = \frac{\pi}{\omega_r} \text{ sec}$$

When the resonant current reaches zero diode 47A turns off causing the resonant current to remain at zero. This causes the amplitude of the voltage $V_c$ to remain substantially constant for a time interval ($t_1 < t < t_2$). However, this time interval can be changed to decrease the frequency of $V_d$.

The time interval during which the resonant current is zero is typically in the order of tenths of a millisecond. Therefore the voltage across the capacitor is substantially constant.

$$V_c(t) = 2V_s \quad (t_1 < t < t_2)$$

$$V_d(t) = V_s$$

At the end of this time delay switch 47 is turned on and the resonant current resumes. During the negative half cycle of the resonant current the output voltage can be approximated by the following equation.

$$V_c(t) = V_s(1 - \cos\omega t) \quad (t_2 < t < t_3)$$

$$V_d(t) = V_c$$

The complete quasi-resonant cycle time interval $t_3$ consist of the LC resonant cycle of the inductor 24 and capacitor 26 plus the time delay $t_d$. The quasi-resonant cycle can be calculated as follows.

$$t_3 = \frac{2\omega}{\omega_r} + t_d = 2\omega \sqrt{LC} + t_d$$

$$f_r = \frac{1}{2\omega \sqrt{LC} + t_d}$$

In Ac motors it is desirable to control the frequency of the converter to minimize the phase ripple current. This current contains three current ripple components. Minimizing these components reduces the heating of the machine. The phase ripple current is reduced by controlling the delay time interval, as discussed below.

A control signal for the time delay must be calculated in order to reduce phase ripple currents and heating to a minimum. This control signal can be developed using a performance index and calculated as follows.

$$\sigma = \Sigma[(I_a - I_a^*)^2 + (I_b - I_b^*)^2 + (I_c - I_c^*)^2]$$

Where
$I_a$ = Actual phase (a) current
$I^*_a$ = Desired phase (a) current
$I_b$ = Actual phase (b) current
$I^*_b$ = Desired phase (b) current
$I_c$ = Actual phase (c) current
$I^*_c$ = Desired phase (c) current This performance index is compared to the desired value of the performance index. Whenever this comparison yields the desired value, the switch 47 is closed and the resonant cycle resumes. To those skilled in the art, it will be appreciated that this permits the resonant interval to be selected to reduce noise.

The phase currents of the inverter are controlled by hysteresis based bang-bang controller. The magnitude of phase currents is practically invariant during the small zero crossing interval permitting the logic of the inverter to be determined at the leading edge of this time interval. Implementation of this switching function is delayed until the end of the zero crossing interval. By knowing the switching logic and the inverter phase currents, the current Id can be uniquely predicted.

$$I_d = S_1 i_a + S_3 i_b + S_5 i_c$$

Where
$S_1$ = Switch 27
$S_3$ = Switch 37
$S_5$ = Switch 31

Equation 13 can be implemented by the following truth table and the above switch designations.

| Switch Nos & State | | | Current |
|---|---|---|---|
| $S_1$ | $S_3$ | $S_5$ | $I_d$ |
| 0 | 0 | 0 | 0 |
| 0 | 0 | 1 | $i_c$ |
| 0 | 1 | 0 | $i_b$ |
| 0 | 1 | 1 | $i_a$ |
| 0 | 1 | 1 | $-i_a$ |
| 1 | 0 | 0 | $+i_a$ |
| 1 | 0 | 1 | $-i_b$ |
| 1 | 1 | 0 | $-i_c$ |
| 1 | 1 | 1 | 0 |

Figure 9:
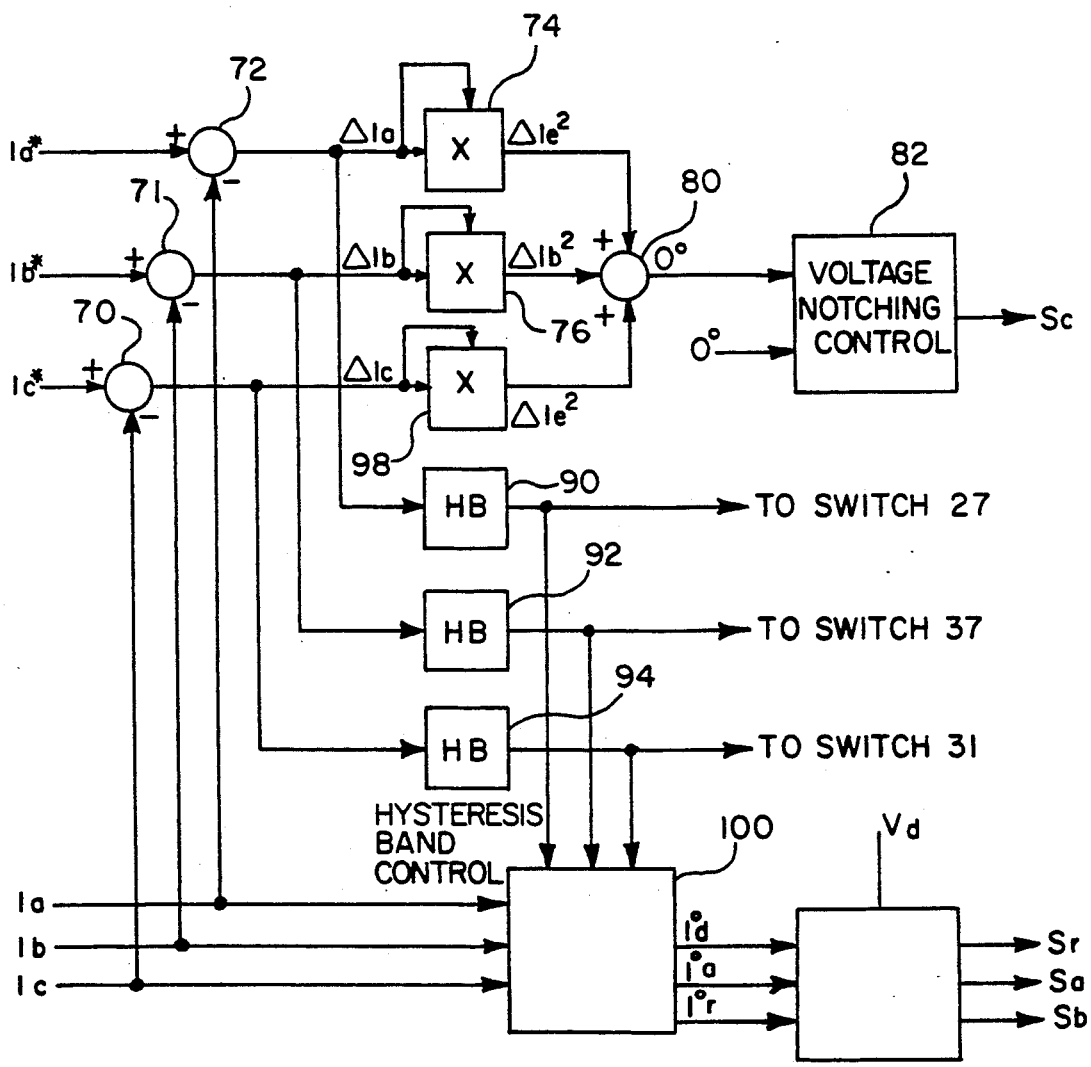
FIG. 9 is a block diagram of a circuit for generating the control signals for the converter and an associated inverter.

FIG. 9 is a diagram of a circuit for generating control signals for the converter. More specifically the desired phase currents $I^*_a$, $I^*_b$, $I^*_c$ are compared to the actual phase currents $I_a$, $I_b$, $I_c$ by three subtractors 70, 71, and 72 to generate error signals $\Delta I_a$, $\Delta I_b$, $\Delta I_c$.

Each of the error signals are squared by multiples 74, 76, and 78. An adder combines the output signals of these multiplier to produce the performance index and the actual performance index is compare to the desired value for this index by a comparator to produce the control signal for switch 47.

Current error signals from comparators 70, 71, and 72 are also coupled as input signals to hysteresis band controllers 90, 92, and 94 to produce signals to control the inverter to produce the desired phase currents.

The control signals to the inverter and the desired current signals are combined by a combining circuit 100 to produce a total current signal $I^*_d$. This signal is combined with the desired total current signal $I_d$, the resonant current signal $I_r$ and the voltage signal $V_d$ to produce signals for controlling the initial inductor current and the delay signals.

Figure 10:
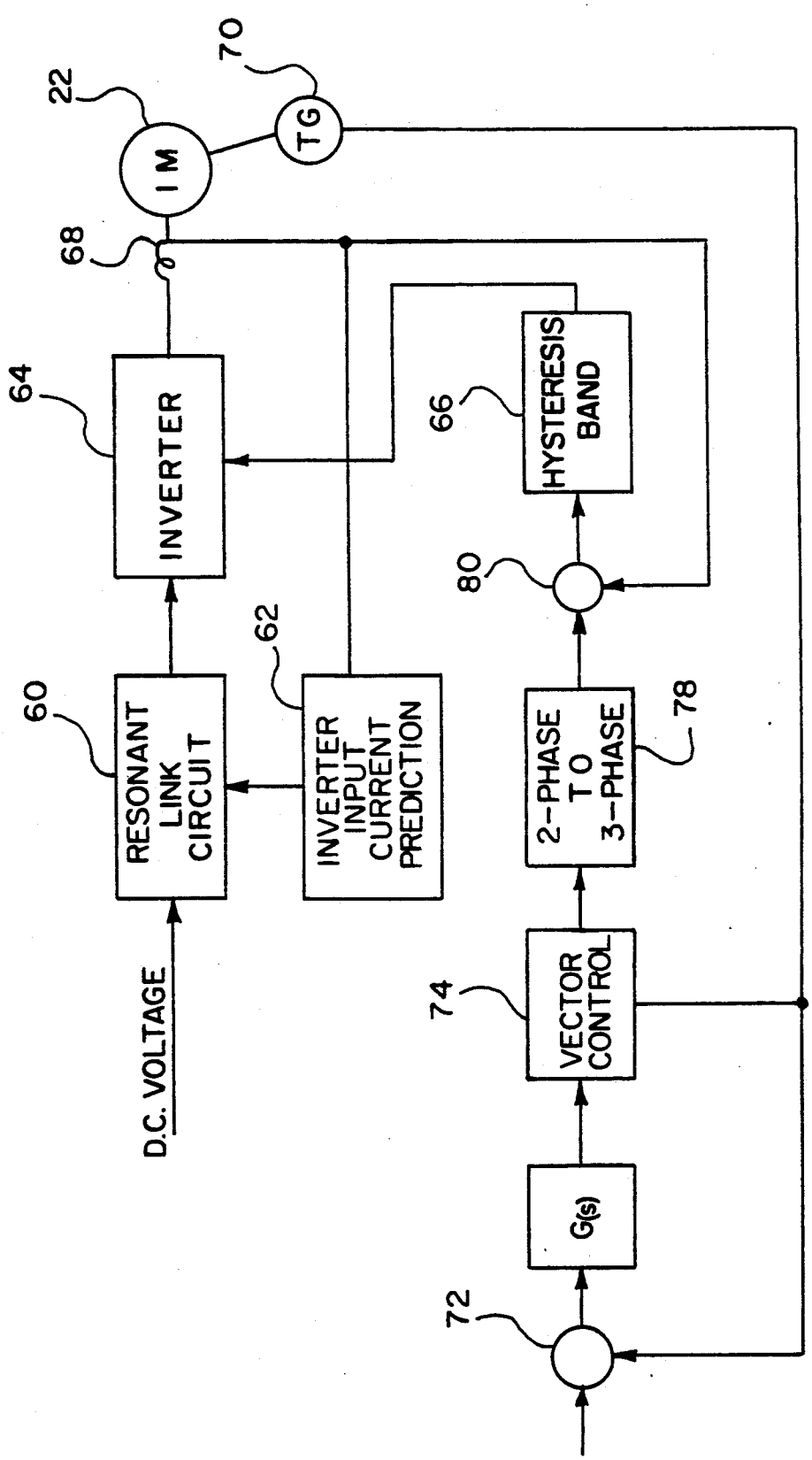
FIG. 10 is a block diagram of the control system utilizing the resonant link converter.

FIG. 10 is a more detailed functional block diagram of a system for controlling an AC motor 22 using a resonant link converter and bi-directional initial currents in accordance with the disclosed invention. More specifically, a DC voltage from a power source is coupled to the input of a resonant link converter circuit 60. The resonant link circuit 60 is in turn operated by a control signal from an inverter input prediction circuit 62 to produce the voltage $V_d$ as previously discussed. Phase current sensors 68 produce current signals necessary to predict the input current.

The voltage $V_d$ is coupled to the input of a conventional inverter 64 which is in turn controlled by a hysteresis band controller 66 to produce the desired phase currents. Phase currents of the motor are measured by a sensor 68 to produce current measurements for each phase. Similarly, a tachometer 70 is coupled to the motor 22 to produce a signal indicating the direction and velocity of rotation or the AC motor 22.

The output signal of the tachometer 70 is also coupled to the input of a comparator 72 where it is compared to the desired rotational signal to produce an error signal. The error signal is processed by a current and velocity controller 74 to produce signals specifying the desired speed and phase currents. In response to these signals and the output signal of the tachometer 70, the Vector control circuit 74 produces a two phase control signal. The Vector control signal generates a two-phase signal which is processed by a two phase to three phase circuit 78 to produce current commands for each of the phases of the motor 22. The current command signals are compared to the actual current command signals by a second comparator 80 to produce a difference current signals for each phase. These signals are coupled to a hysteresis controller 66 to produce output signals which are coupled to the inverter 64 to produce the desired operating conditions.

The operability of the invention was first demonstrated by a computer simulation and later by a working embodiment of the invention. The simulated values for $V_d$, $I_r$, $I_d$, and $I^*_d$ are illustrated in FIG. 11.

We claim:

1. A circuit for converting a DC voltage produced by a first power supply to a pulsating DC voltage useful for operating an AC machine, said pulsating DC voltage being available at first and second output terminals of said circuit, said circuit comprising in combination: a quasi series resonant circuit including at least an inductor and a capacitor selectively coupled in series to form a terminal common with a first one of said output terminals, first, second, third and forth switching circuits, and a second power DC supply; said first, third and fourth switches being selectively coupled and operable in response to first switching signals to couple said inductor between the terminals of said first DC power supply to establish an initial current of a selected first amplitude and polarity in said inductor; said second, third and fourth switches being selectively coupled and operable under second switching conditions to couple said inductor between the terminals of said second DC power supply to establish a second initial current of a second selected amplitude and polarity in said inductor; said first, third and forth switch means being selectively coupled and operable under third switching conditions to couple said inductor and capacitor in series to form said quasi series resonant circuit and to couple said quasi series resonant circuit between the terminals of said first DC power supply to establish a resonant current in said quasi resonant circuit; said third switch means being operable under forth switching conditions to selectively interrupt said resonant current by decoupling at least one terminal of said capacitor from said first one of said output terminals, thereby establishing a resonant current of a selected amplitude in said quasi series resonant circuit to control the selectively interrupt said resonant current to selectively change the duration of the pulses of said pulsating DC voltage.

2. A circuit for converting a DC voltage produced by a first DC power supply to a pulsating DC voltage useful for operating an AC machine, said pulsating DC voltage being available between first and second output terminals of said circuit, said circuit comprising in combination: a quasi series resonant circuit including at least an inductor and a capacitor selectively coupled in series with the junction of said inductor and said capacitor coupled to a first one of said output terminals, first, second, third and forth switching circuits, and a second power DC supply; said capacitor having first and second terminals with said first terminal being coupled to a first terminal of said first power source, the second terminal being coupled to a first one of said output terminals through said third switch means, said fourth switch means being coupled in parallel with said capacitor; said inductor having first and second terminals with said first terminal being coupled to said a first one of said output terminals, said second terminal being coupled to said first power supply by said first switch means and to said second power supply by said second switch means; with said first, said third and said forth switch means being operable under the first switching conditions to establish a first initial current in said inductor; said second, third and forth switches being operable under second switching conditions to establish a second initial current in said inductor; said first, third and forth switches being operable under a third switching condition to establish a resonant current in the quasi series resonant circuit comprising said capacitor and said inductor; and said third switch being operable under a forth switching condition to interrupt said resonant current; thereby permitting the peak amplitude of said pulsed voltage and the duration of each pulse of said pulsed DC output voltage to be independently controlled.

3. A circuit for converting a DC voltage produced by a first power supply to a pulsating DC voltage in accordance with claim 2 wherein said second terminal of said capacitor is directly coupled to a second terminal of said third switch means and a first terminal of said third switch means is directly coupled to said at least a first one of said output terminals; said second terminal of said inductor is directly coupled to a first terminal of said first switch and to a second terminal of said second switch, a second terminal of said first switch being directly coupled to said first DC power source; the second terminal of said second switch being directly coupled to said second power supply.

4. A circuit in accordance with claim 3 further including circuit means for producing a signal indicating the desired rotational speed of said AC machine, circuit means for producing a signal indicating the actual rotational speed of said AC machine, circuit comparing means for comparing said signal indicating the desired rotational speed of said AC machine to said signal indicating the actual rotational speed of said AC machine to produce a first error signal, circuit means for producing signals indicating the desired phase currents of said AC machine, circuit means for producing signals indicating the actual phase current of said AC machine, circuit means for comparing said signal indication the actual phase current of said AC machine to said signal indicating the desired phase current of said AC machine to produce a second error signal, circuit means responsive to said first and second error signals to adjust said first, second, third and forth switching conditions to reduce the values of said first and second error signals to a desired preselected value.

* * * * *